United States Patent
Jasper et al.

(10) Patent No.: US 7,257,171 B2
(45) Date of Patent: Aug. 14, 2007

(54) METHOD AND APPARATUS FOR REFERENCE SYMBOL AIDED CHANNEL ESTIMATION

(75) Inventors: Steven C. Jasper, Hoffman Estates, IL (US); Robert J. Corke, Glen Ellyn, IL (US); Colin D. Frank, Park Ridge, IL (US); Isam R. Makhlouf, Lake Zurich, IL (US)

(73) Assignee: Motorola, Inc., Schaumburg, IL (US)

( * ) Notice: Subject to any disclaimer, the term of this patent is extended or adjusted under 35 U.S.C. 154(b) by 290 days.

(21) Appl. No.: 11/098,208

(22) Filed: Apr. 4, 2005

(65) Prior Publication Data

US 2006/0222093 A1    Oct. 5, 2006

(51) Int. Cl.
*H04L 27/06* (2006.01)
*H04B 1/10* (2006.01)

(52) U.S. Cl. .................................. 375/340; 375/350
(58) Field of Classification Search ............... 375/224, 375/316, 340, 350
See application file for complete search history.

(56) References Cited

U.S. PATENT DOCUMENTS

| | | | |
|---|---|---|---|
| 6,473,506 B1 | 10/2002 | Hook | |
| 6,542,562 B1* | 4/2003 | Ostberg et al. | 375/350 |
| 6,765,969 B1* | 7/2004 | Vook et al. | 375/259 |
| 7,072,783 B2* | 7/2006 | Makhlouf et al. | 702/69 |
| 7,181,185 B2* | 2/2007 | Park et al. | 455/306 |
| 2004/0190560 A1* | 9/2004 | Maltsev et al. | 370/503 |
| 2004/0248541 A1* | 12/2004 | Park | 455/306 |
| 2004/0264561 A1* | 12/2004 | Alexander et al. | 375/232 |
| 2005/0141657 A1* | 6/2005 | Maltsev et al. | 370/503 |

OTHER PUBLICATIONS

Rim, et al., Decision-directed Channel Estimation for M-QAM-modulated OFDM Systems; pp. 1742-1746, 2002 IEEE Vehicular Technology Conference.
Edfors, et al, OFDM Channel Estimation by Singular Value Decomposition; IEEE Transactions on Communications, vol. 46, No. 7, Jul. 1998.

* cited by examiner

*Primary Examiner*—Jean B. Corrielus
(74) *Attorney, Agent, or Firm*—Valerie M. Davis

(57) ABSTRACT

A system that includes a receiver (100) that is configured for: selecting (210) a set of demodulator output samples and a corresponding set of reference symbols; generating (220) a set of raw channel estimates based on the set of demodulator output samples and the corresponding set of reference symbols; subdividing (230) the set of raw channel estimates into a plurality of subsets; assigning and applying (240) a corresponding reference symbol magnitude quantization scheme to each subset; determining (250) a set of filter coefficients that is based on the quantization schemes applied to the subsets of raw channel estimates; and combining (260) the set of raw channel estimates with the set of filter coefficients to generate a channel estimate.

19 Claims, 3 Drawing Sheets

METHOD AND APPARATUS FOR REFERENCE SYMBOL AIDED CHANNEL ESTIMATION

CROSS-REFERENCE TO RELATED APPLICATIONS

The present application is related to the following U.S. application commonly owned together with this application by Motorola, Inc.:

Ser. No. 11/098,218, filed Apr. 4, 2005, titled "Channel Estimation Using Linearly-Constrained Filter Coefficients" by Makhlouf, et al.

FIELD OF THE INVENTION

The present invention relates generally to decision-directed channel estimation in a receiver apparatus.

BACKGROUND OF THE INVENTION

Pilot symbol aided Minimum Mean-Squared Error (MMSE) channel estimation (which uses only pre-determined or known symbols, commonly referred to in the art as pilot and preamble symbols, in deriving channel estimates) is a well-known method of obtaining channel gain information for symbol decoding in single or multi-carrier systems. For example, the pilot symbol aided MMSE channel estimation method is used in Orthogonal Frequency Division Multiplexing (OFDM) systems such as those that operate in accordance with the Institute of Electrical and Electronics Engineers (IEEE) 802.11a and 802.11g standards.

In some systems, pilot symbol placement and density is designed to enable adequate pilot symbol aided MMSE channel estimation only for low speed applications, for example applications at pedestrian speeds. However, when such systems are operated at higher speeds, a strictly pilot symbol aided channel estimation methodology often proves inadequate. To improve channel estimation for such systems at higher speeds, a decision directed MMSE channel estimation approach may be used. This decision directed approach is also referred to herein as reference symbol aided channel estimation to cover the potential use of both pre-determined as well as regenerated symbols in the channel estimation process. The regenerated reference symbols are typically but not necessarily data symbols.

To implement the reference symbol aided MMSE channel estimation approach using pilot and regenerated data symbols, a receiver in an OFDM system generally includes a MMSE predictive channel estimator to extrapolate the channel gain at a given data symbol location or instant. The MMSE estimator is essentially a linear filter that produces smoothed or predicted channel estimates from a set of "raw" or instantaneous estimates typically at nearby (in the time or frequency sense) symbols. The estimator combines these raw channel estimates with filter coefficients selected from a corresponding set of filter coefficients to predict the channel estimate for the given data symbol.

A set of coefficients can be pre-computed for each data symbol instant and stored in a look-up table. For symmetric delay/Doppler profiles the coefficients are real-valued, providing computational and memory savings. As an improvement, several banks of coefficients pertaining to different channel conditions (e.g., fading rate, signal-to-noise ratio (SNR), etc.) can be provided and the best selected adaptively.

For multi-level constellation systems (e.g., 16 or 64 Quadrature Amplitude Modulation (QAM)) the noise variances of the instantaneous channel estimates depend on the magnitudes of the modulated symbols. To optimize performance in this case, the filter coefficients should ideally be designed as functions of the symbol magnitudes. However, this can lead to a prohibitively large memory requirement. For an N-tap estimator, the number of coefficient sets is equal to $M^N$, where M is the number of symbol magnitudes (e.g., M=3 for 16 QAM, and M=9 for 64 QAM). For example, a ten tap estimator in a receiver using 64 QAM would require $9^{10}$ different sets of coefficients.

One known method for minimizing coefficient memory is to assume equal symbol magnitude in computing estimator coefficients. However, this approach results in sub-optimal performance for receivers using 16 QAM or 64 QAM due to what is commonly referred to in the art as "noise enhancement." In forming the raw channel estimates, noise is enhanced whenever a symbol's squared magnitude is less than the average. For instance, the raw channel estimate for a symbol i is given by $g_i=v_i/p_i=(p_i h_i+n_i)/p_i=h_i+(n_i/p_i)$, where v is the receiver's demodulator output, p is the symbol value, h is the channel gain and n is the noise. As can be seen, for small magnitudes the effective noise term $n_i/p_i$ is magnified. Typically, the average noise enhancement is about 2.8 dB for 16 QAM and about 4.3 dB for 64 QAM.

Thus, there exists a need for a channel estimation method and apparatus that gives improved performance for multi-level constellations without necessitating an impractical amount of memory. It is further desirable that the channel estimation method and apparatus enable higher-speed operation of systems with pilot symbol aided MMSE channel estimation.

BRIEF DESCRIPTION OF THE FIGURES

A preferred embodiment of the invention is now described, by way of example only, with reference to the accompanying figures in which.

DETAILED DESCRIPTION OF THE INVENTION

Figure 1:
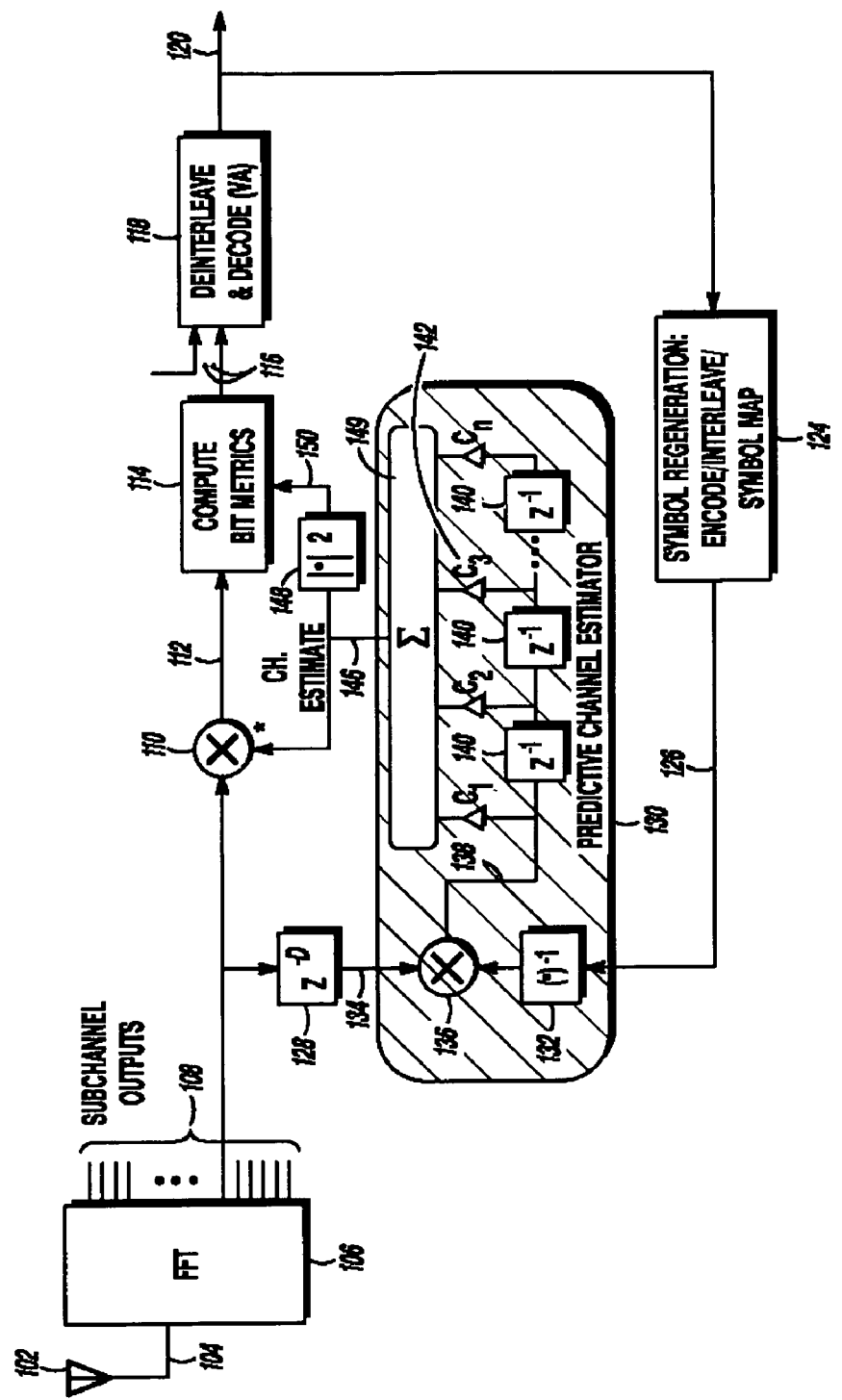
FIG. 1 illustrates a receiver that includes a channel estimator that operates in accordance with an embodiment of the present invention.

While this invention is susceptible of embodiments in many different forms, there are shown in the figures and will herein be described in detail specific embodiments, with the understanding that the present disclosure is to be considered as an example of the principles of the invention and not intended to limit the invention to the specific embodiments shown and described. Further, the terms and words used herein are not to be considered limiting, but rather merely descriptive. It will also be appreciated that for simplicity and clarity of illustration, common and well-understood elements that are useful or necessary in a commercially feasible embodiment may not be depicted in order to facilitate a less obstructed view of these various embodiments. Also, elements shown in the figures have not necessarily been drawn to scale. For example, the dimensions of some of the elements are exaggerated relative to each other. Further, where considered appropriate, reference numerals have been repeated among the figures to indicate corresponding elements.

Generally speaking pursuant to the various embodiments of the present invention, apparatus and a method for channel estimation is described that enables high-speed operation of systems with pilot symbol aided MMSE channel estimation, wherein coefficient memory is reduced while providing for greatly improved performance over known methods that assume equal symbol magnitudes. Those skilled in the art will realize that the above recognized advantages and other advantages described herein are merely exemplary and are not meant to be a complete rendering of all of the advantages of the various embodiments of the present invention.

Referring now to the drawings, and in particular FIG. 1, a receiver is shown and indicated generally at 100, the receiver 100 includes a decision directed channel estimation method and apparatus in accordance with embodiments of the present invention. Those skilled in the art, however, will recognize and appreciate that the specifics of this illustrative example are not specifics of the invention itself and that the teachings set forth herein are applicable in a variety of alternative settings. Receiver 100 may be, for instance, included in an OFDM system (i.e., an OFDM receiver) that operates in the 4.9 GHz frequency spectrum, or any other suitable frequency spectrum, in accordance with the IEEE 802.11a or 802.11g standards. Moreover, receiver 100 may be configured to implement various modulation techniques such as, for instance, 16-QAM, 64-QAM, Phase Shift keying (PSK), etc. In order to show a practical example of these various teachings, the receiver 100 is described as an OFDM receiver. However, it should be readily appreciated by one skilled in the art that this illustration is not meant to limit the present invention to OFDM systems, and it is contemplated that various embodiments of the present invention may be implemented in other types of systems.

More specifically, in accordance with the embodiment illustrated in FIG. 1 receiver 100 ideally comprises: one or more antenna elements 102, a demodulation/demodulator apparatus 106 (for example one that implements a Fast Fourier Transform (FFT) operation), a multiplier 110, a bit metrics computer 114, a deinterleaver and decoder 118 that is preferably viterbi algorithm-based, a symbol regenerator 124, a delay element 128 that is typically pre-determined depending on the receiver implementation, and a magnitude squaring operator 148. Conventional apparatus well known in the art, for example, may be used to implement the above elements of receiver 100.

Receiver 100 further includes a channel estimator (ideally an MMSE estimator) 130 in accordance with the various teachings of the present invention. Estimator 130 may be implemented as a suitable processor device that is programmed to execute a set of instructions in accordance with embodiments of the present invention that is stored in a suitable memory (not shown) that may be accessed by receiver 100. Estimator 130 may alternatively be implemented in suitable hardware. Also typically included in receiver 100 but not shown for the sake of clarity in illustrating the embodiments of the present invention is conventional and suitable receiver circuitry, as is well known in the art, between the antenna(s) 102 and the demodulator 106 for performing all required filtering and down-conversion operations needed to obtain a time-domain digital baseband signal 104.

In operation, a radio frequency (RF) signal is received by antenna(s) 102, which is converted to a digital baseband signal 104. Signal 104 is processed by the FFT demodulation operation 106 to generate a set of demodulated sub-channel complex symbols at outputs 108 for each transmitted OFDM baud. For each complex symbol in the set of sub-channel symbol outputs 108, a multiplier 110 scales the symbol by the complex conjugate of the current complex channel estimate 146. The scaled complex symbol 112 is then fed into the bit metric computer 114 that produces a bit metric 116 (ideally a soft bit metric) based on the scaled complex symbol 112 and the complex channel estimate magnitude squared 150 that is output from the magnitude squaring operator 148. The soft bit metrics 116 from all sub-channels feed the deinterleaver and viterbi algorithm-based decoder 118 that produces bit decisions 120.

The channel estimator 130 operates on each sub-channel as follows. The bit decisions 120 are fed into a symbol regenerator 124 that re-encodes, interleaves, and maps the bit decisions 120 to produce a regenerated symbol 126 for each sub-channel. The regenerated symbol 126 corresponds to the complex symbol in the set of sub-channel symbol outputs 108 from the FFT demodulator 106 D-symbols ago, due to deinterleaving, decoding, and symbol regeneration delays. The delayed complex sub-channel output 134 comes from a D-symbol delay element 128, and is time-aligned with the regenerated symbol 126. The delayed, time-aligned sub-channel symbol 134 is scaled by the inverse of the regenerated symbol 126 via an inverse operator 132 and multiplier 136. The output of the multiplier 138 is the raw channel gain estimate from D-symbols ago, and it feeds the tapped delay-line structure represented by the delay elements 140 and channel estimation filter coefficients 142 shown in FIG. 1. The tapped delay line outputs are added together by a summer 144, the output of which is the current channel estimate 146. The channel estimator 130 is ideally predictive in nature due to the non-zero delay D.

Figure 2:
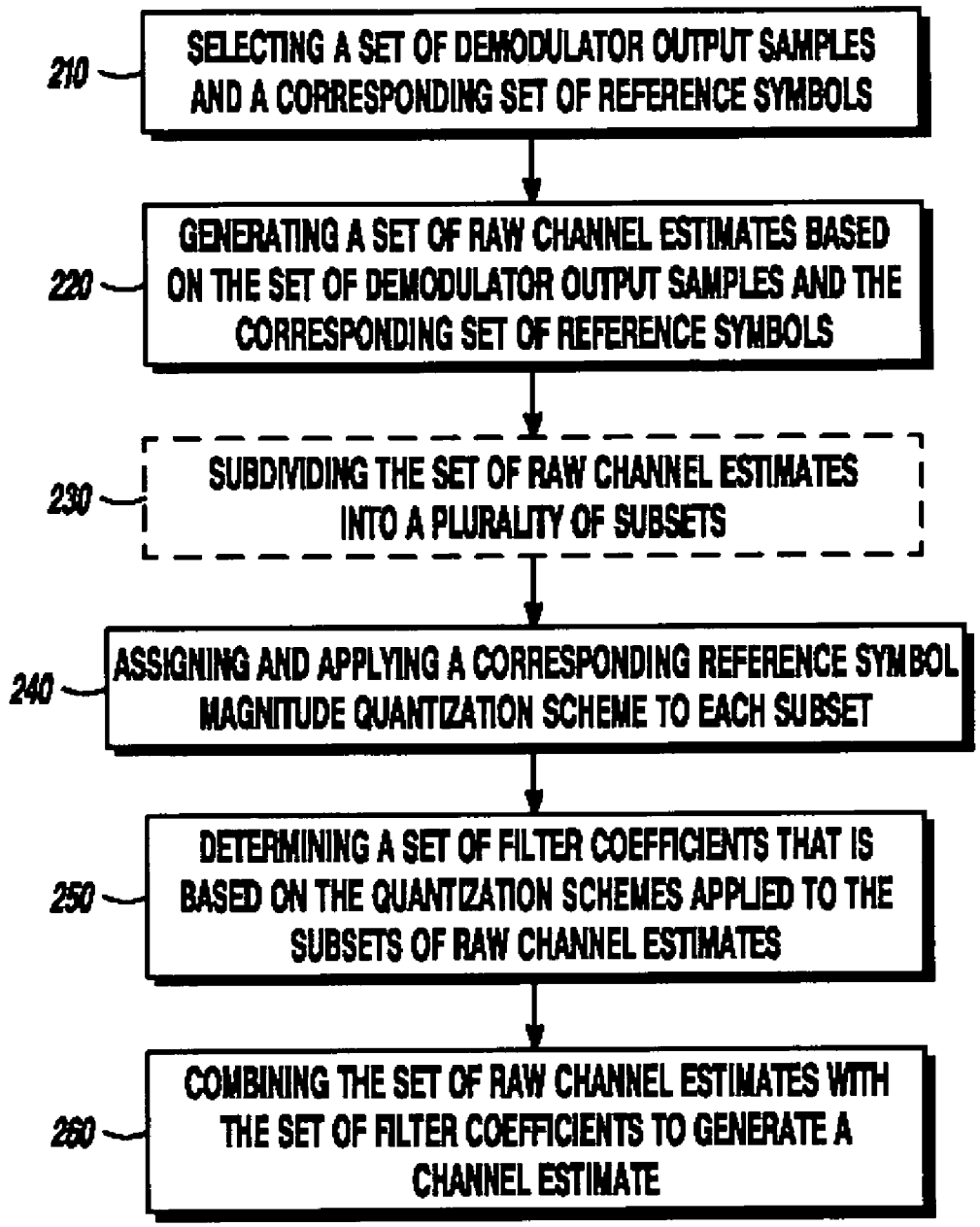
FIG. 2 illustrates a method for channel estimation in accordance with an embodiment of the present invention.

Turning now to FIG. 2, a flow diagram illustrating a method for channel estimation in accordance with embodiments of the present invention is shown and generally indicated at 200. Before detailing the steps of method 200, it would be useful to describe the principles behind reference symbol aided channel estimation. The objective of reference symbol aided channel estimation is to determine an estimate $h_k$ of the channel gain at the kth data symbol. To estimate these quantities a receiver has at its disposal:

an N×1 vector (or set) of demodulated symbol samples $v_k = [v_{1k}\ v_{2k}\ \ldots\ v_{Nk}]^T$, where T denotes transpose;

a vector (or set) of known preamble or regenerated data symbols $p_k = [p_{1k}\ p_{2k}\ \ldots\ p_{Nk}]^T$; and the expected channel conditions including worst-case Doppler and delay spreads.

For rapidly changing channel conditions, the number N and location of the reference symbols used will typically depend on the data symbol index k. For example, typically only symbols close to a given data symbol in the time or frequency sense will have much influence on the solution. Thus, theoretically, others symbols can be safely ignored in the interest of reducing complexity. In the discussion that follows we will drop the explicit k notation for the sake of simplicity and ease of description.

From estimation theory it can be shown that a linear MMSE estimate of h, given a set of demodulated symbol samples v, can be found according to:

$$\hat{h} = Kv = R_{hv}R_{vv}^{-1}v, \quad (1)$$

where $R_{hv}=E\{hv^H\}$, $R_{vv}=E\{vv^H\}$, and superscript H denotes a conjugate transpose matrix operation.

The sample vector v can be modeled as $$v=Ph+n, \quad (2)$$

where $P=\mathrm{diag}(p)$ is the N×N diagonal matrix of the known symbols, and h and n are N×1 vectors of the channel gains and noise, respectively. Hence, $$R_{hv}=E\{hv^H\}=E\{h(Ph+n)^H\}=E\{hh^HP^H\}+E\{hn^H\}=E\{hh^H\}P^H, \quad (3)$$

where the second term $E\{hn^H\}$ can be dropped out since noise and channel gain are uncorrelated. $E\{hh^H\}$ can be written as $\gamma r^H_h$, where γ is the average channel power gain and $r_h$ is the normalized N×1 cross-correlation vector of the channel fading between the data symbol instant k and the reference instants. Thus, $$R_{hv}=\gamma r^H_h P^H. \quad (4)$$

In a similar way it can be shown that $R_{vv}$ is equal to $$R_{vv}=\gamma P R_{hh} P^H + R_{nn}, \quad (5)$$

where $R_{hh}$ is the normalized covariance matrix of the channel gains, and $R_{nn}$ is the noise covariance (both N×N). Like $r_h$, $R_{hh}$ can be predetermined according to expected fading statistics.

If we assume that the noise component is stationary and white, then $R_{nn}=\sigma_n^2 I$. Making the appropriate substitutions the estimator (1) becomes $$\tilde{h}=Kv=\gamma r^H_h P^H (\gamma P R_{hh} P^H + \sigma_n^2 I)^{-1} v. \quad (6)$$

This can be further simplified by performing some manipulations involving the square, invertible P matrix, to yield $$\tilde{h}=r^H_h (R_{hh}+(\sigma_n^2/\gamma)P^{-1}P^{-H})^{-1}P^{-1}v. \quad (7)$$

The received signal-to-noise ratio ρ is given by $$\rho = \frac{\gamma E\{|p_i|^2\}}{\sigma_n^2}. \quad (8)$$

The noise term $(\sigma_n^2/\gamma)P^{-1}P^{-H}$ can therefore be written as $\rho^{-1}E\{|p_i|^2\}P^{-1}P^{-H}$. By assuming (for the remainder of the detailed description) that the constellation values for all modulations are normalized such that $E\{|p_i|^2\}=1$, and by defining $g=P^{-1}v$ as the set of "raw" channel gain estimates obtained by dividing the reference symbols into the received samples ($g_i=v_i/p_i$) and $$c=(R_{hh}+\rho^{-1}P^{-1}P^{-H})^{-1}r_h^* \quad (9)$$

as the N×1 vector of estimator coefficients, the channel estimator becomes simply $$\tilde{h} = c^T g = \sum_{i=1}^{N} c_i g_i. \quad (10)$$

We now return to the detailed description of the method 200 for generating a channel estimate for a current demodulator output sample as illustrated in FIG. 2. The channel estimator must select (210) a set of demodulator output samples, $v_i$, and a corresponding set of reference symbols, $p_i$, where i is typically from 1 to N (the number of taps in the estimator) and wherein each selected reference symbol has a time corresponding selected demodulator output sample. Ideally the reference symbols that are used to generate the current channel estimate are a sequence of reference symbols that are 1 to N symbols closest (in time or frequency) to the corresponding current demodulator output sample and may be, for example, a combination of known references symbols and regenerated reference symbols or may be all regenerated reference symbols. Each reference symbol ideally has a magnitude that is one of a plurality of predetermined magnitudes, which depends on the modulation type used. For example, if the receiver uses 64 QAM, each reference symbol magnitude may be one of the nine different available symbol magnitudes for this modulation type. Alternatively, if the receiver uses 16 QAM, each reference symbol magnitude may be one of the three different available symbol magnitudes for this modulation type.

The estimator generates (220) a set (that may be a sequence for instance) of raw channel estimates $g_i$, for example by dividing each selected demodulator output sample $v_i$ by its time corresponding reference symbol $p_i$. In accordance with embodiments of the present invention, the estimator subdivides (230) the set of raw channel estimates into a plurality of subsets, wherein the step of subdividing is ideally based upon one or more criteria such as, for instance, age or relevance. There may be anywhere from one to N−1 raw channel estimates in each subset.

Figure 3:
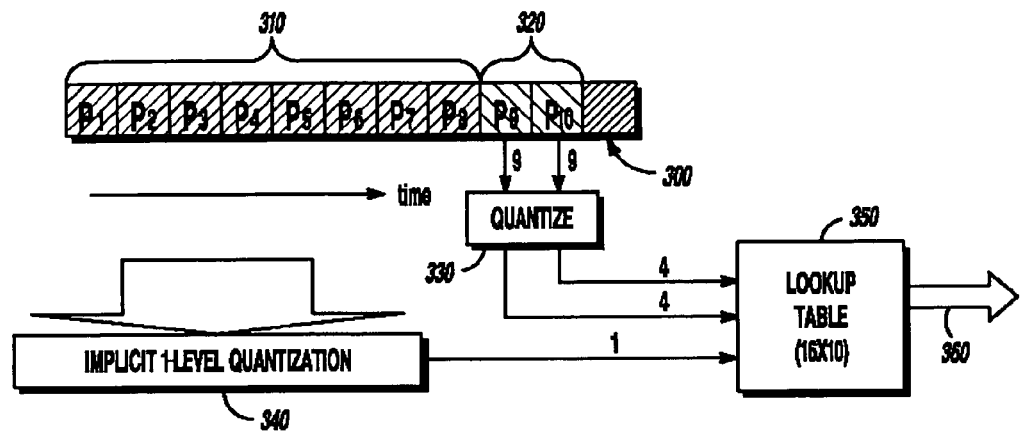
FIG. 3 illustrates a channel estimation implementation in accordance with an embodiment of the present invention.

For example in one embodiment, which will be explained in more detail below by reference to FIGS. 3 and 4, a sequence of raw channel estimates may be subdivided based upon comparing the age of the raw channel estimates to a threshold. The age of a given raw channel estimate $g_i$ may be determined, for instance, based on how close the corresponding $p_i$ (used to generate the channel estimate) is to the current demodulated output sample in time. Alternatively, the relevance of a given raw channel estimate $g_i$ may be determined based on how close the corresponding $p_i$ (used to generate the channel estimate) is to the current demodulated output sample in frequency.

The estimator then assigns and applies (240) a corresponding reference symbol magnitude quantization scheme to each subset used to select the corresponding set of filter coefficients. It should be readily understood that a quantization scheme could be assigned to each subset a priori (e.g., prior to the actual channel estimations being generated) and the quantization scheme applied on an instantaneous basis as the channel estimates are being generated. The quantization scheme could be a single-level quantization scheme, a multi-level quantization scheme, or no quantization, wherein the quantization scheme may generally also depend on the criteria used to subdivide the set of raw channel estimates. In a single-level quantization scheme, the plurality of symbol magnitudes associated with the selected set of reference symbols is quantized to one level. In a multi-level quantization scheme, the plurality of symbol magnitudes associated with the selected set of reference symbols is quantized to two or more levels. Finally, where the quantization scheme is no quantization, the plurality of symbol magnitudes associated with the selected set of reference symbols are not quantized at all.

To achieve the benefits of the present invention, namely of reducing coefficient memory while retaining a suitable performance level for applications at relatively higher speeds, one of the subsets could be assigned a single-level quantization scheme. For example, in one implementation the estimator may divide the set of raw channel estimates into two subsets based upon whether the age of raw channel estimates is within an age threshold. More specifically, the age threshold is based on how close a selected regenerated symbol is in time to the current demodulator output sample. Those raw channel estimates that are computed from a selected regenerated symbol that is outside of the age threshold are ideally assigned a single-level quantization scheme, which may be, for example, to assume equal magnitude symbols. The more recent symbols that are within the age threshold, e.g., that are the most R recent symbols (such as the closest 2 or 3 symbols) could be, for example, assigned a quantization scheme of no quantization wherein the corresponding coefficients are based upon the symbol magnitude. Such an approach is based on the realization that the observations further back in time should have less influence on the channel estimate. So a suboptimal, equal-magnitude assumption should have less impact if confined there.

With this approach, the coefficient vector is given by $$c = (R_{hh} + \rho^{-1} U)^{-1} r_h^*, \quad (11)$$

where $U = \text{diag}(u) = \text{diag}([u_1 \ u_2 \ldots u_n])$ defines a set of noise level weights. For the most recent R (e.g., 2 or 3) symbols, the weights are set to their nominal, symbol-dependent values, i.e., $u_i = |p_i|^{-2}$ for $i=1$ to R. For the remaining, earlier symbols, the weights are set to the average noise enhancement level $E\{|p_i|^{-2}\}$ corresponding to each symbol's modulation type, i.e., $u_i = 1$, 1.9, and 2.7 for PSK, 16 QAM, and 64 QAM, respectively.

Note that at the beginning of a burst, the early portion of the observation interval may contain two modulation types (for example, binary PSK preamble/Signal fields, followed by 16 QAM or 64 QAM data), resulting in two different weights. With this approach, the maximum number of coefficient sets per symbol index is reduced from $M^N$ to $M^R$, where M is the number of distinct symbol magnitudes (3 and 9 for 16 QAM and 64 QAM, respectively).

To further reduce the number of coefficient sets in accordance with the teachings of the present invention, the R symbol-dependent weights may be quantized. This may be done by partitioning the M possible symbol magnitudes into K subsets, where K<M. All symbols whose magnitudes belong to a particular subset k (k=1 to K) are assigned a common weight $U_k$ equal to the average noise enhancement for that subset. With this approach, the maximum number of coefficient sets is further reduced from $M^R$ to $K^R$.

Once a quantization scheme has been applied to each subset, the estimator determines (250) a corresponding set of filter coefficients wherein the filter coefficients are based on the quantization schemes applied to the subsets of raw channel estimates. More specifically, a corresponding filter coefficient is assigned to each raw estimate in each subset. In one embodiment, the corresponding filter coefficient may be obtained from a look-up table that is indexed based on, for example, the magnitude of the corresponding regenerated symbol used to generate the raw channel estimate and/or the quantization scheme applied to the subset in which the raw estimate is included.

The estimator then combines (260) the set of raw channel estimates with the set of filter coefficients to generate the channel estimate for the current demodulated output sample. In one implementation, the channel estimate is the inner product of the set of raw channel estimates and the set of filter coefficients, which is computed by multiplying each raw channel estimate with its corresponding coefficient and summing all of these multiplies, as illustrated by reference to FIG. 1.

It should be readily appreciated that quantization is most advantageous for 64 QAM, since it has the largest number of available symbol magnitudes. Accordingly, FIGS. 3 and 4 illustrate an application of the present invention based upon a receiver using this modulation type. FIG. 3 illustrates a set $(p_1-p_{10})$ of regenerated symbols from which a corresponding set of raw channel estimates are calculated. As can be seen the regenerated symbols (and hence the raw channel estimates) are subdivided into two subsets 310 and 320, wherein the symbols in subset 320 (i.e., symbols $p_9$ and $p_{10}$) fall within the threshold of being within R=2 symbols away from the current symbol 300. Whereas, the symbols in subset 310 fall outside of the threshold of being within R=2 symbols away from the current symbol 300. A single-level quantization scheme is assigned to the symbols in subset 310 by (implicit) 1-level quantizer 340, and a multi-level (in this case a four-level, i.e., K=4) quantization scheme is applied to subset 320 by quantizer 330. Quantizer 340 is referred to as implicit since, with a single-level output, no actual quantization need be implemented. A quantization level (e.g., represented by quantization subset index q) for each of the symbols in subset 320 is output by quantizer 330. The values output by quantizers 330 and 340, in addition to other possible inputs including symbol index as previously mentioned, are input to lookup table 350, which outputs channel estimator coefficients 360.

Figure 4:
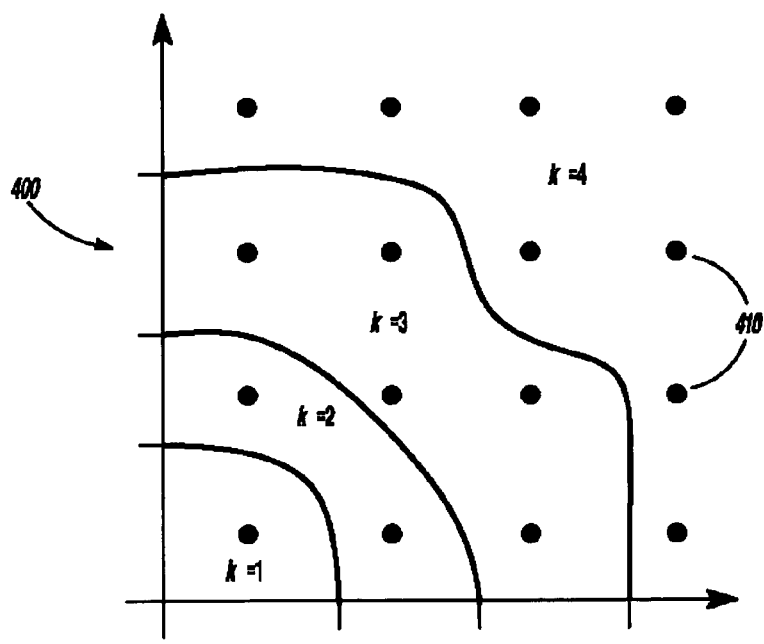
FIG. 4 is a 64 QAM quarter constellation plot of symbol magnitudes used to illustrate the channel estimation implementation shown in FIG. 3.

FIG. 4 shows the upper-right quadrant of the 64 QAM constellation with an exemplary 4-ary partition for K=1-4, which may be used as the quantization scheme for subset 320. Those skilled in the art will realize that the other quadrants are symmetric. For the best receiver performance, symbols causing the greatest noise enhancement are ideally most accurately characterized. Hence, the inner constellation points in this partition are left unquantized. The following Table 1 gives exemplary noise weights for the quantization scheme illustrated in FIG. 4.

TABLE 1

| k | Noise Weight $U_k$ |
|---|---|
| 1 | 21 |
| 2 | 4.2 |
| 3 | 1.607 |
| 4 | 0.692 |

Another embodiment of the present invention may be described by reference to FIG. 2. In this embodiment all of the steps are performed except for the step 230 of subdividing the set of raw channel estimates into a plurality of subset. Further, a multi-level quantization scheme is assigned to the set of raw channel estimates. The current channel estimate can then be determined similarly to the manner as described above.

The methods in accordance with various embodiments of the present invention provide for a quantization approach wherein the number of levels K is varied according to a temporal subset, with no quantization or higher values of K used for more recent subsets. Those skilled in the art will realize that if two-dimensional estimation (i.e., additionally utilizing channel information from other subchannels) is employed, the same approach can be used, but the number of quantization levels is varied according to the time-frequency distance between the observation and estimation instants.

While the invention has been described in conjunction with specific embodiments thereof, additional advantages and modifications will readily occur to those skilled in the art. The invention, in its broader aspects, is therefore not limited to the specific details, representative apparatus, and illustrative examples shown and described. Various alterations, modifications and variations will be apparent to those skilled in the art in light of the foregoing description. Thus, it should be understood that the invention is not limited by the foregoing description, but embraces all such alterations, modifications and variations in accordance with the spirit and scope of the appended claims.

What is claimed is:

1. A method for reference symbol aided channel estimation comprising the steps of:
    selecting a set of demodulator output samples and a corresponding set of reference symbols, wherein each reference symbol in the set has a magnitude that is one of a set of predetermined magnitudes;
    generating a set of raw channel estimates based on the set of demodulator output samples and the corresponding set of reference symbols;
    subdividing the set of raw channel estimates into a plurality of subsets;
    assigning and applying a corresponding reference symbol magnitude quantization scheme to each subset;
    determining a set of filter coefficients that is based on the quantization schemes applied to the subsets of raw channel estimates; and
    combining the set of raw channel estimates with the set of filter coefficients to generate a channel estimate.

2. The method of claim 1, wherein the set of raw channel estimates is generated by dividing each demodulator output sample in the set of demodulator output samples by a corresponding reference symbol in the set of reference symbols.

3. The method of claim 1, wherein the set of predetermined magnitudes is based on available symbol magnitudes in at least one of a Quadrature Amplitude Modulation (QAM) scheme and a Phase Shift Keying (PSK) scheme.

4. The method of claim 1, wherein the corresponding set of reference symbols includes at least one known reference symbol.

5. The method of claim 1, wherein each reference symbol in the set of reference symbols is a regenerated reference symbols.

6. The method of claim 1, wherein the channel estimate is the inner product of the set of raw channel estimates and the set of filter coefficients.

7. The method of claim 1, wherein the filter coefficients are retrieved from a look-up table that is indexed based on the quantization schemes applied to the subsets of raw channel estimates.

8. The method of claim 1, wherein the subsets of raw channel estimates are subdivided based upon at least one criterion.

9. The method of claim 8, wherein the at least one criterion includes at least one of age and relevance.

10. The method of claim 9, wherein:
    the raw channels estimates in subsets having at least one of age and relevance that are outside of a threshold are combined with corresponding filter coefficients that are based on a single-level quantization scheme; and
    the raw channel estimates in the remaining subsets are combined with corresponding filter coefficients that are based on at least one of a quantization scheme of no quantization and a multi-level quantization scheme.

11. The method of claim 1, wherein one subset is assigned a single-level quantization scheme.

12. The method of claim 1, wherein at least one subset is assigned a quantization scheme of no quantization.

13. The method of claim 1, wherein at least one subset is assigned a multi-level quantization scheme.

14. The method of claim 13, wherein the multi-level quantization scheme is based on a modulation type used.

15. A receiver comprising:
    at least one antenna element for receiving a signal;
    receiver circuitry for generating a baseband signal from the received signal;
    a demodulator for generating output samples from the baseband signal; and
    a processor configured for:
        selecting a set of demodulator output samples and a corresponding set of reference symbols, wherein each reference symbol in the set has a magnitude that is one of a set of predetermined magnitudes;
        generating a set of raw channel estimates based on the set of demodulator output samples and the corresponding set of reference symbols;
        subdividing the set of raw channel estimates into a plurality of subsets;
        assigning and applying a corresponding reference symbol magnitude quantization scheme to each subset;
        determining a set of filter coefficients that is based on the quantization schemes applied to the subsets of raw channel estimates; and
        combining the set of raw channel estimates with the set of filter coefficients to generate a channel estimate.

16. The receiver of claim 15, wherein the receiver is used in an Orthogonal Frequency Division Multiplexing (OFDM) system.

17. The receiver of claim 16, wherein the OFDM system is operated in accordance with one of the Institute of Electrical and Electronics Engineering 802.11a and 802.11g standards.

18. The receiver of claim 15, wherein the receiver operates in the 4.9 GHz frequency spectrum.

19. A method for reference symbol aided channel estimation comprising the steps of:
    selecting a set of demodulator output samples and a corresponding set of reference symbols, wherein each reference symbol in the set has a magnitude that is one of a set of predetermined magnitudes;
    generating a set of raw channel estimates based on the set of demodulator output samples and the corresponding set of reference symbols;
    assigning and applying a multi-level reference symbol quantization scheme to the set of raw channel estimates;
    determining a set of filter coefficients that is based on the multi-level quantization scheme applied to the set of raw channel estimates; and
    combining the set of raw channel estimates with the set of filter coefficients to generate a channel estimate.

* * * * *

UNITED STATES PATENT AND TRADEMARK OFFICE
CERTIFICATE OF CORRECTION

PATENT NO. : 7,257,171 B2 Page 1 of 1
APPLICATION NO. : 11/098208
DATED : August 14, 2007
INVENTOR(S) : Jasper et al.

It is certified that error appears in the above-identified patent and that said Letters Patent is hereby corrected as shown below:

In Claim 5, column 9, line 44, change "symbols" to --symbol--

Signed and Sealed this

Twelfth Day of August, 2008

JON W. DUDAS
*Director of the United States Patent and Trademark Office*